(12) United States Patent
Lee et al.

(10) Patent No.: US 11,489,373 B2
(45) Date of Patent: *Nov. 1, 2022

(54) METHOD AND APPARATUS FOR PROVIDING WIRELESS CHARGING POWER TO A WIRELESS POWER RECEIVER

(71) Applicant: SAMSUNG ELECTRONICS CO., LTD.

(72) Inventors: Kyung-Woo Lee, Seoul (KR); Kang-Ho Byun, Suwon-si (KR); Hee-Won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

This patent is subject to a terminal disclaimer.

(21) Appl. No.: 17/006,126

(22) Filed: Aug. 28, 2020

(65) Prior Publication Data

US 2020/0395794 A1 Dec. 17, 2020

Related U.S. Application Data

(63) Continuation of application No. 15/945,378, filed on Apr. 4, 2018, now Pat. No. 10,763,707, which is a (Continued)

(30) Foreign Application Priority Data

Jul. 9, 2012 (KR) ........................ 10-2012-0074492
Jul. 27, 2012 (KR) ........................ 10-2012-0082278

(51) Int. Cl.
*H02J 7/00* (2006.01)
*H02J 50/10* (2016.01)
(Continued)

(52) U.S. Cl.
CPC .............. *H02J 50/90* (2016.02); *H02J 50/10* (2016.02); *H02J 50/12* (2016.02); *H02J 50/40* (2016.02); *H02J 50/60* (2016.02); *H02J 50/80* (2016.02)

(58) Field of Classification Search
CPC ....................................................... H02J 50/90
(Continued)

(56) References Cited

U.S. PATENT DOCUMENTS 9,966,802 B2    5/2018  Lee
2004/0145342 A1 7/2004  Lyon
(Continued)

FOREIGN PATENT DOCUMENTS

CN     1194759 A    9/1998
CN   101272063 A    9/2008
(Continued)

OTHER PUBLICATIONS

Communication dated Nov. 12, 2020, issued by the State Intellectual Property Office of P.R. China English in Chinese Application No. 201810447040.9.
(Continued)

*Primary Examiner* — Edward Tso
*Assistant Examiner* — Ahmed H Omar
(74) *Attorney, Agent, or Firm* — Sughrue Mion, PLLC

(57) ABSTRACT

A control method of a wireless power transmitter and a wireless power transmitter. The method includes transmitting a first power with a first cycle; transmitting a second power with a second cycle, wherein the second cycle is greater than the first cycle; when a wireless power receiver is placed within a charging area and is detected by the first power, upon detecting the wireless power receiver by the first power, transmitting a third power to drive the wireless power receiver to transmit a search signal to the wireless
(Continued)

power transmitter; and when the wireless power receiver is placed within the charging area and is not detected by the first power, using the second power to detect the wireless power receiver and drive the wireless power receiver to transmit the search signal to the wireless power transmitter.

18 Claims, 13 Drawing Sheets

Related U.S. Application Data continuation of application No. 13/937,793, filed on Jul. 9, 2013, now Pat. No. 9,966,802.

(51) Int. Cl.
  *H02J 50/90* (2016.01)
  *H02J 50/60* (2016.01)
  *H02J 50/12* (2016.01)
  *H02J 50/40* (2016.01)
  *H02J 50/80* (2016.01)

(58) Field of Classification Search
  USPC .......................................................... 320/108
  See application file for complete search history.

(56) References Cited

U.S. PATENT DOCUMENTS

| | | |
|---|---|---|
| 2006/0284593 A1 | 12/2006 | Nagy |
| 2008/0231120 A1 | 9/2008 | Jin |
| 2009/0284082 A1 | 11/2009 | Mohammadian |
| 2010/0084918 A1 | 4/2010 | Fells |
| 2010/0176659 A1 | 7/2010 | Aoyama |
| 2010/0181961 A1 | 7/2010 | Novak |
| 2010/0203892 A1 | 8/2010 | Nagaraja |
| 2010/0270867 A1 | 10/2010 | Abe |
| 2011/0105142 A1 | 5/2011 | Sawai |
| 2011/0148349 A1 | 6/2011 | Kim |
| 2011/0181239 A1 | 7/2011 | Kadoyama |
| 2011/0196544 A1 | 8/2011 | Baarman |
| 2011/0221391 A1 | 9/2011 | Won |
| 2011/0285210 A1 | 11/2011 | Lemmens |
| 2011/0285349 A1 | 11/2011 | Widmer |
| 2011/0301668 A1* | 12/2011 | Forsell ................. H02J 7/00034 |
| | | 607/60 |
| 2012/0169293 A1 | 7/2012 | Won |
| 2012/0223589 A1* | 9/2012 | Low ......................... H02J 50/80 |
| | | 307/104 |
| 2012/0248891 A1 | 10/2012 | Drennen |
| 2013/0062961 A1 | 3/2013 | Park |
| 2013/0099734 A1 | 4/2013 | Lee |
| 2013/0154558 A1 | 6/2013 | Lee |
| 2013/0234532 A1 | 9/2013 | Fells |
| 2013/0293190 A1 | 11/2013 | Pijnenburg |
| 2014/0008990 A1 | 1/2014 | Yoon |
| 2015/0155739 A1 | 6/2015 | Walley |
| 2017/0317721 A1* | 11/2017 | Kozaki ................... H02J 50/40 |

FOREIGN PATENT DOCUMENTS

| | | |
|---|---|---|
| CN | 101335468 | 12/2008 |
| CN | 101821919 | 9/2010 |
| CN | 102082449 | 6/2011 |
| CN | 102545312 | 7/2012 |
| JP | 2008017248 | 1/2008 |
| JP | 2010093742 | 4/2010 |
| JP | 2010166659 | 7/2010 |
| JP | 2011507481 | 3/2011 |
| JP | 2012504931 | 2/2012 |
| KR | 1020110014641 | 2/2011 |
| KR | 1020110065552 | 6/2011 |
| WO | 2010040015 | 4/2010 |

OTHER PUBLICATIONS

European Search Report dated Jun. 7, 2016, issued in counterpart application No. 13817609.4-1804, 10 pages.
Chinese Office Action dated Jul. 5, 2016, issued in counterpart application No. 201380036897.7, 13 pages.
Chinese Office Action dated Mar. 27, 2017, issued in counterpart application No. 201380036897.7, 21 pages.
Japanese Office Action dated Jun. 5, 2017, issued in counterpart application No. 2015-521543, 4 pages.
Korean Office Action dated Dec. 10, 2018, issued in counterpart application No. 10-2012-0082278, 6 pages.

* cited by examiner

METHOD AND APPARATUS FOR PROVIDING WIRELESS CHARGING POWER TO A WIRELESS POWER RECEIVER

PRIORITY

This application is a continuation of U.S. application Ser. No. 15/945,378, filed Apr. 4, 2018, which is a continuation application claiming priority under 35 U.S.C. § 120 to U.S. patent application Ser. No. 13/937,793, filed on Jul. 9, 2013, now U.S. Pat. No. 9,966,802. in the United States Patent and Trademark Office, which claims priority under U.S.C. § 119(a) to Korean Patent Application Serial Nos. 10-2012-0074492 and 10-2012-0082278, which were filed in the Korean Intellectual Property Office on Jul. 9, 2012 and Jul. 27, 2012, respectively, the entire disclosure of each of which is incorporated herein by reference.

BACKGROUND OF THE INVENTION

1. Field of the Invention

The present invention relates generally to a wireless power transmitter and method of controlling the same, and more particularly, to a wireless power transmitter and method for transmitting wireless charging power to a wireless power receiver.

2. Description of the Related Art

Mobile terminals, such as cell phones, Personal Digital Assistants (PDAs), etc., are powered by rechargeable batteries, which are recharged with electric energy provided using separate charging devices. For example, for a charging device and a battery having contacting terminals on their outer surfaces, the battery is electrically connected to the charging device by having their contacting terminals contact each other. However, when using such a contact charging method, the contacting terminals are susceptible to contamination by dirt or corrosion when exposed to moisture because they are exposed on the outer surfaces if the charging device and the battery. Obviously, any contamination or corrosion will negatively affect charging.

To address this problem, wireless charging or contactless charging technologies have been developed.

Wireless charging technology uses wireless power transmission and reception. For example, a battery of a cell phone can be wirelessly charged merely by placing the cell phone on a charging pad, without connecting or plugging in a separate charging connector. Wireless charging technology is commonly applied to electric toothbrushes or shavers.

There are a number of different wireless charging technologies, i.e., an electromagnetic induction method using coils, a resonance method using resonance, and a Radio Frequency (RF)/micro wave radiation method that converts electric energy into microwaves for transmission.

The electromagnetic induction method transfers power between primary and secondary coils. Specifically, moving a magnet through a coil produces an induced current from which a magnetic field is produced at a transmission end, and the change in the magnetic field at a receiving end induces a current to generate energy therein. This phenomenon is commonly referred to as magnetic induction, and a power transmission method based on magnetic induction provides superior energy transmission efficiency.

The resonance method uses a resonance-based power transmission principle based on the Coupled Mode Theory, i.e., a physical concept that a tuning fork being placed next to a wine glass causes the wine glass to ring with the same frequency. However, in resonance-based power transmission, resonated electromagnetic waves carry electric energy, instead of resonating sound. Resonant electric energy of the electromagnetic waves is directly transferred to a device having the same resonant frequency, and the non-used part of the energy is re-absorbed into the magnetic field rather than being dispersed in the air. As a result, resonant electric energy is not deemed harmful to surrounding machines or bodies.

Although various studies on wireless charging methods have been done, standards for prioritizing wireless charging, searching for wireless power transmitters/receivers, selecting a communication frequency between a wireless power transmitter and receiver, adjusting wireless power, selecting a matching circuit, distributing communication time for each wireless power receiver in a single charging cycle, etc., have not been provided. In this regard, a need exists for standardization relating to a method of detecting wireless power receivers by a wireless power transmitter.

SUMMARY OF THE INVENTION

The present invention is designed to address at least the problems and/or disadvantages described above and to provide at least the advantages described below.

Accordingly, an aspect of the present invention is to provide a standard for general operations of a wireless power transmitter.

Another aspect of the present invention is to provide a structure and process for detecting a wireless power receiver by a wireless power transmitter.

In accordance with an aspect of the present invention, a control method of a wireless power transmitter is provided. The method includes transmitting a first power with a first cycle; transmitting a second power with a second cycle, wherein the second cycle is greater than the first cycle; when a wireless power receiver is placed within a charging area and is detected by the first power, upon detecting the wireless power receiver by the first power, transmitting a third power to drive the wireless power receiver to transmit a search signal to the wireless power transmitter; and when the wireless power receiver is placed within the charging area and is not detected by the first power, using the second power to detect the wireless power receiver and drive the wireless power receiver to transmit the search signal to the wireless power transmitter.

In accordance with another aspect of the present invention, a wireless power transmitter is provided. The wireless power transmitter includes a resonator; and a controller configured to control to transmit a first power with a first cycle through the resonator, control to transmit a second power with a second cycle through the resonator, wherein the second cycle is greater than the first cycle, when a wireless power receiver is placed within a charging area and is detected by the first power, upon detecting the wireless power receiver by the first power, control to transmit a third power to drive the wireless power receiver to transmit a search signal to the wireless power transmitter, through the resonator, and when the wireless power receiver is placed within the charging area and is not detected by the first power, control to use the second power to detect the wireless power receiver and drive the wireless power receiver to transmit the search signal to the wireless power transmitter.

In accordance with another aspect of the present invention, a control method of a wireless power transmitter is provided. The method includes transmitting a first power with a first cycle; transmitting a second power with a second cycle, wherein the second cycle is greater than the first cycle; in response to detecting that a wireless power receiver is placed within a charging area while transmitting the first power, transmitting a third power to drive the wireless power receiver to transmit a search signal to the wireless power transmitter; and in response to detecting that the wireless power receiver is placed within the charging area while transmitting the second power, maintaining to transmit the second power to drive the wireless power receiver to transmit the search signal to the wireless power transmitter.

In accordance with another aspect of the present invention, a wireless power transmitter is provided. The wireless power transmitter includes a resonator; and a controller configured to control to transmit a first power with a first cycle through the resonator, control to transmit a second power with a second cycle through the resonator, wherein the second cycle is greater than the first cycle, in response to detecting that a wireless power receiver is placed within a charging area while transmitting the first power, control to transmit a third power to drive the wireless power receiver to transmit a search signal to the wireless power transmitter, through the resonator, and in response to detecting that the wireless power receiver is placed within the charging area while transmitting the second power, maintain to transmit the second power to drive the wireless power receiver to transmit the search signal to the wireless power transmitter, through the resonator.

In accordance with another aspect of the present invention, a control method of a wireless power transmitter is provided. The method includes transmitting a first power during a first duration; after a predetermined duration after transmitting the first power, transmitting a second power during a second duration, wherein the first duration is less than the second duration; in response to detecting that a wireless power receiver is placed within a charging area while transmitting the first power, transmitting a third power to drive the wireless power receiver to transmit a search signal to the wireless power transmitter; and in response to detecting that the wireless power receiver is placed within the charging area while transmitting the second power, maintaining to transmit the second power to drive the wireless power receiver to transmit the search signal to the wireless power transmitter.

In accordance with another aspect of the present invention, a wireless power transmitter is provided. The wireless power transmitter includes a resonator; and a controller configured to control to transmit a first power during a first duration through the resonator; after a predetermined duration after transmitting the first power, control to transmit a second power during a second duration through the resonator, wherein the first duration is less than the second duration, in response to detecting that a wireless power receiver is placed within a charging area while transmitting the first power, control to transmit a third power to drive the wireless power receiver to transmit a search signal to the wireless power transmitter, through the resonator, and in response to detecting that the wireless power receiver is placed within the charging area while transmitting the second power, maintain to transmit the second power to drive the wireless power receiver to transmit the search signal to the wireless power transmitter, through the resonator.

BRIEF DESCRIPTION OF THE DRAWINGS

The above and other aspects, features, and advantages of certain embodiments of the present invention will become more apparent from the following description thereof with reference to the attached drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
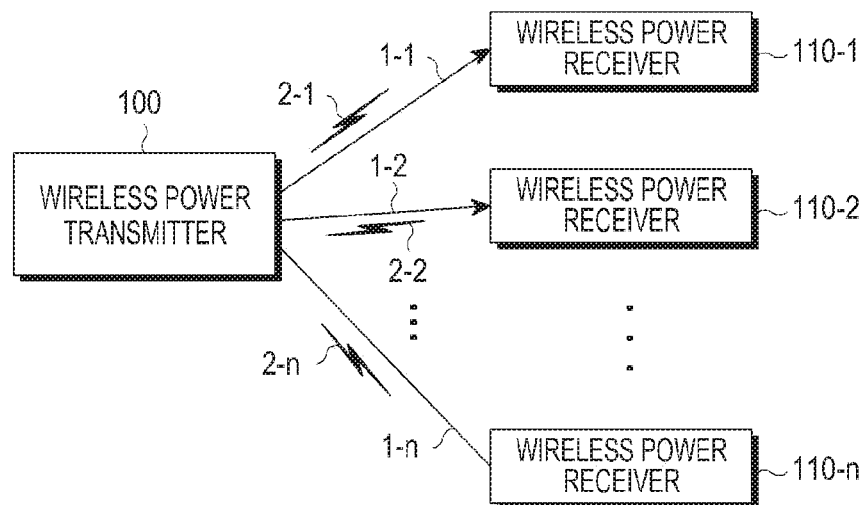
FIG. 1 illustrates a wireless charging system according to an embodiment of the present invention.

FIG. 1 illustrates a wireless charging system according to an embodiment of the present invention.

Referring to FIG. 1, the wireless charging system includes a wireless power transmitter 100 and wireless power receivers 110-1, 110-2, and 110-*n*. For example, the wireless power receivers 110-1, 110-2, and 110-*n* may be implemented in mobile communication terminals, Personal Digital Assistants (PDAs), Portable Multimedia Players (PMPs), smartphones, etc.

The wireless power transmitter 100 wirelessly transmits powers 1-1, 1-2, and 1-*n* to the wireless power receivers 110-1, 110-2, and 110-*n*, which are authenticated via a predetermined authentication procedure.

The wireless power transmitter 100 makes an electrical connection with the wireless power receivers 110-1, 110-2, and 110-*n*. For example, the wireless power transmitter 100 transmits wireless power to the wireless power receivers 110-1, 110-2, and 110-*n* in an electromagnetic waveform.

The wireless power transmitter 100 also performs bidirectional communication with the wireless power receivers 110-1, 110-2, and 110-*n*. The wireless power transmitter 100 and the wireless power receivers 110-1, 110-2, 110-*n* process and transmit/receive packets 201, 202, and 2-*n*, which include certain frames, which will be described in more detail below.

The wireless power transmitter 100 provides the wireless power to the wireless power receivers 110-1, 110-2, and 110-*n*, e.g., based on a resonance method.

When the resonance method is used by the wireless power transmitter 100, a distance between the wireless power transmitter 100 and the wireless power receivers 110-1, 110-2, and 110-*n* may be 30 m or less. However, when an electromagnetic induction method is used by the wireless power transmitter 100, a distance between the wireless power transmitter 100 and the wireless power receivers 110-1, 110-2, and 110-*n* may be 10 cm or less.

Each of the wireless power receivers 110-1. 110-2, and 110-*n* charges a battery therein using the wireless power received from the wireless power transmitter 100. The wireless power receivers 110-1, 110-2, and 110-*n* also transmit a signal to the wireless power transmitter 100, requesting the wireless power transmission, information for wireless power reception, information on a state of the wireless power receiver, control information of the wireless power transmitter, etc., which will be described in more detail below.

The wireless power receivers 110-1, 110-2, and 110-*n* transmit a message indicating a respective charging state to the wireless power transmitter 100.

For example, the wireless power transmitter 100 may include a display, which displays the respective states of the wireless power receivers 110-1, 110-2, and 110-*n*, based on the respective messages received from the wireless power receivers 110-1, 110-2, and 110-*n*. The wireless power transmitter 100 may also display an estimate of a remaining time until completion of the charging the respective wireless power receivers 110-1, 110-2, and 110-*n*.

The wireless power transmitter 100 transmits a control signal to each of the wireless power receivers 110-1, 110-2, and 110-*n* to disable its wireless charging function. After receiving the control signal from the wireless power transmitter 100, the wireless power receivers 110-1, 110-2, and 110-*n* disable their own wireless charging functions.

communication unit 213, e.g., a transceiver. The wireless power receiver 250 includes a power receiver 251, a controller 252, and a communication unit 253, e.g., a transceiver.

The power transmitter 211 wirelessly transmits power to the wireless power receiver 250. Herein, the power transmitter 211 may supply the power in an Alternating Current (AC) waveform, or may convert power in a Direct Current (DC) form into the AC waveform using an inverter (not shown).

The power transmitter 211 may be implemented as a built-in battery or as a power receiving interface that receives power from an outside source. A person having ordinary skill in the art will readily understand that the power transmitter 211 is not limited thereto, but may be implemented by another hardware device that provides power in an AC waveform.

In addition, the power transmitter 211 provides the AC waveform as electromagnetic waves to the wireless power receiver 250, i.e., the power receiver 251. For example, the power transmitter 211 may include a loop coil to transmit and receive the electromagnetic waves, wherein inductance L of the loop coil may be variable.

The controller 212 controls general operations of the wireless power transmitter 200. For example, the controller 212 may control the general operations of the wireless power transmitter 200 by using a control algorithm, a program, or an application read from a storage memory (not shown). The controller 212 may be implemented as a Central Processing Unit (CPU), a microprocessor, a minicomputer, etc.

The communication unit 213 communicates with the wireless power receiver 250, i.e., the communication unit 253, in a predetermined communication method. For example, the communication unit 213 communicates with the communication unit 253 of the wireless power receiver 250 using Near Field Communication (NFC), Zigbee communication, infrared communication, ultraviolet communication, etc. More specifically, the communication unit 213 may use the Institute of Electrical and Electronics Engineers (IEEE) 802.15.4 Zigbee communication method or the Carrier Sense Multiple Access with Collision Avoidance (CSMA/CA) algorithm.

The communication unit 213 transmits an information signal of the wireless power transmitter 200. For example, the communication unit 213 may unicast, multicast, or broadcast the information signal.

Table 1 below shows an example of a data structure of the information signal transmitted from the wireless power transmitter 200. For example, the wireless power transmitter 200 may transmit the signal shown in Table 1 in predetermined intervals, wherein the signal is referred to as a notice signal.

TABLE 1

| Frame Type | Protocol Version | Sequence Number | Network ID | RX to Report (schedule mask) | Reserved | Number of RX |
|---|---|---|---|---|---|---|
| Notice | 4 bits | 1 byte | 1 byte | 1 byte | 5 bits | 3 bits |

Figure 2A:
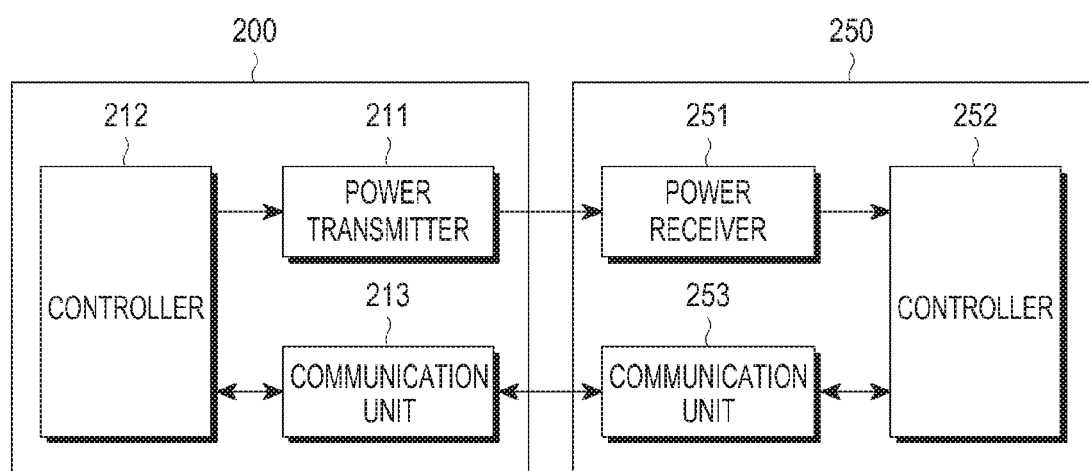
FIG. 2A is a block diagram illustrating a wireless power transmitter and a wireless power receiver, according to an embodiment of the present invention.

FIG. 2A is a block diagram illustrating a wireless power transmitter and a wireless power receiver, according to an embodiment of the present invention.

Referring to FIG. 2A, the wireless power transmitter 200 includes a power transmitter 211, a controller 212, and a In Table 1, the Frame Type field indicates a type of the signal, i.e., a Notice signal. The Protocol Version field indicates a type of a protocol of the communication method, and is assigned 4 bits. The sequence Number field indicates a sequential order of the corresponding signal, and assigned 1 byte. For example, the sequential order of the Sequence Number may be incremented by 1 for each signal transmission or reception. The Network ID field indicates a network identifier of the wireless power transmitter 200, and is assigned 1 byte. The Rx to Report (schedule mask) field indicates the wireless power receiver that is to report to the wireless power transmitter 200, and is assigned 1 byte.

Table 2 shows an example of the Rx to Report (schedule mask) field, according to an embodiment of the present invention.

TABLE 2

| RX to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to wireless power receivers 1 to 8. In the Rx to Report (schedule mask) field shown in table 2, wireless power receivers with bit set to '1', i.e., Rx1, Rx6, Rx7, and Rx8, should report.

The Reserved field is reserved for later use, and is assigned 5 bytes. The Number of Rx field indicates the number of wireless power receivers around the wireless power transmitter 200, and is assigned 3 bits.

The signal in Table 1 may be assigned to a Wireless Power Transfer (WPT) of a data structure in the IEEE 802.15.4 format. Table 3 shows the data structure in the IEEE 802.15.4 format.

TABLE 3

| Preamble | SFD | Frame Length | WPT | CRC16 |
|---|---|---|---|---|

In Table 3, the data structure in the IEEE 802.15.4 format includes a Preamble field, a Start Frame Delimiter (SFD) field, a Frame Length field, a WPT field, a Cyclic Redundancy Check (CRC) 16 field, where the data structure shown in Table 1 may correspond to the WPT field.

The communication unit 213 receives power information from the wireless power receiver 250. For example, the power information includes at least one of a capacity of the wireless power receiver 250, remaining battery power, frequency of charging, battery consumption, battery capacity, and a battery charge/consumption ratio. The communication unit 213 transmits a charging function control signal to control a charging function of the wireless power receiver 250. The charge function control signal is a control signal to controls, i.e., turns on and off, the charging function of the power receiver 251 of the wireless power receiver 250.

The communication unit 213 receives signals from the wireless power receiver 250 and from different wireless power transmitters (not shown). For example, the communication unit 213 receives a Notice signal as shown in Table 1 from a different wireless power transmitter. The controller 252 controls overall operation of the wireless power receiver 250.

Although FIG. 2A illustrates the wireless power transmitter 200 having a separate power transmitter 211 and communication unit 213 and using out-band communications, the wireless power transmitter 200 is not limited thereto. For example, the power transmitter 211 and the communication unit 213 may be integrated in a single hardware device, and thus, the wireless power transmitter 200 may use in-band communications.

Figure 2B:
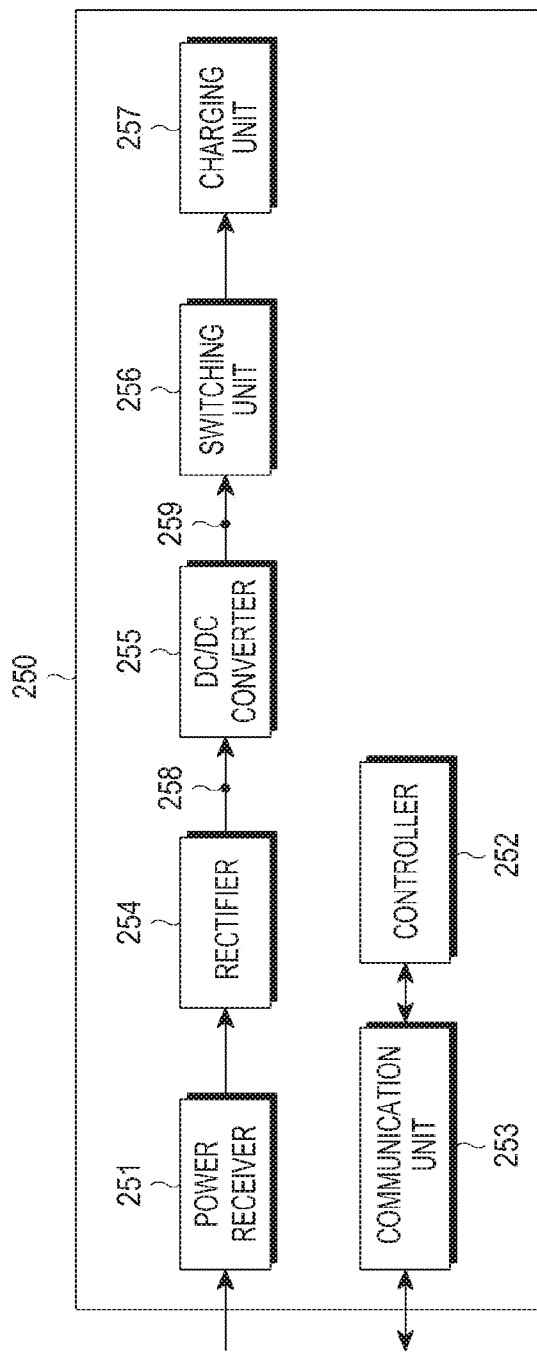
FIG. 2B is a block diagram illustrating a wireless power receiver, according to an embodiment of the present invention.

FIG. 2B is a block diagram illustrating a wireless power receiver, according to an embodiment of the present invention.

Referring to FIG. 2B, the wireless power receiver 250 includes a power receiver 251, a controller 252, a communication unit 253, a rectifier 254, a DC-to-DC converter 255, a switching unit 256, and a charging unit 257. Because the power receiver 251, the controller 252, and the communication unit 253 have already been described above with reference to FIG. 2A, the description of the power receiver 251, the controller 252 and the communication unit 253 will be omitted here.

The rectifier 254, e.g., bridge diodes, rectifies the wireless power received by the power receiver 251 into a DC format. The DC-to-DC converter 255 converts the rectified power with a predetermined gain. For example, the DC-to-DC converter 255 converts the rectified voltage to 5V at its output end 259. However, minimum and maximum values of a voltage to be applied to the front end (input end) 258 of the DC-to-DC converter 255 may be preset, and the values may be recorded in Input Voltage MIN and Input Voltage MAX fields of a request join signal, respectively, which will be discussed in more detail below.

Rated voltage and rated current at the output end 259 of the DC-to-DC converter 255 may also be recorded in Typical Output Voltage and Typical Output Current fields of the request join signal.

The switching unit 256 connects the DC-to-DC converter 255 to the charging unit 257. The switching unit 256 keeps an ON or OFF state, under control of the controller 252. The charging unit 257 stores the converted power input from the DC-to-DC converter 255, when the switching unit 256 is in the ON state.

Figure 3:
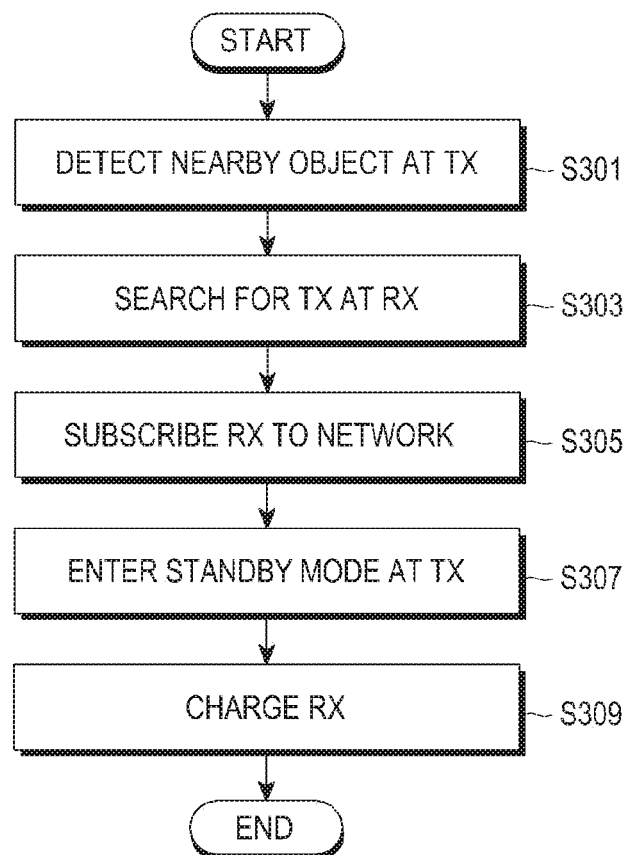
FIG. 3 is a flowchart illustrating a method of controlling a wireless power transmitter/receiver, according to an embodiment of the present invention.

FIG. 3 is a flowchart illustrating a method of controlling a wireless power transmitter/receiver, according to an embodiment of the present invention.

Referring to FIG. 3, the wireless power transmitter detects a nearby object in step S301. For example, the wireless power transmitter may determine whether there is a new object in proximity to the wireless power transmitter by detecting a load change or based on other criteria, such as voltage, current, phase, temperature, etc.

In step S303, the wireless power receiver searches for wireless power transmitters on at least one channel, to determine a wireless power transmitter from which to receive wireless power. For example, the wireless power receiver sends a signal to search for at least one wireless power transmitter to the at least one wireless power transmitter and determines a wireless power transmitter from which to receive wireless power, based on received response signals to the signal to search for at least one wireless power transmitter. The wireless power receiver then pairs with the wireless power transmitter from which to receive wireless power.

The wireless power receiver may subscribe to a wireless power network controlled by the wireless power transmitter from which to receive the wireless power. For example, the wireless power receiver may transmit a subscription request signal to the wireless power transmitter from which to receive the wireless power. In return, the wireless power receiver receives a subscription response signal from the wireless power transmitter. For example, the subscription response signal includes information about whether or not the subscription is allowed. Accordingly, wireless power receiver determines whether it subscribes to the wireless power network using the subscription response signal.

In step S307, the wireless power transmitter from which to receive the wireless power and the wireless power receiver enter a standby mode. In the standby mode, the wireless power transmitter transmits a command signal to the wireless power receiver. The wireless power receiver transmits a report signal or acknowledgment (ACK) signal in response to the command signal. If the command signal includes a command to initiate charging, the wireless power receiver may initiate charging, in step S309.

Figure 4:
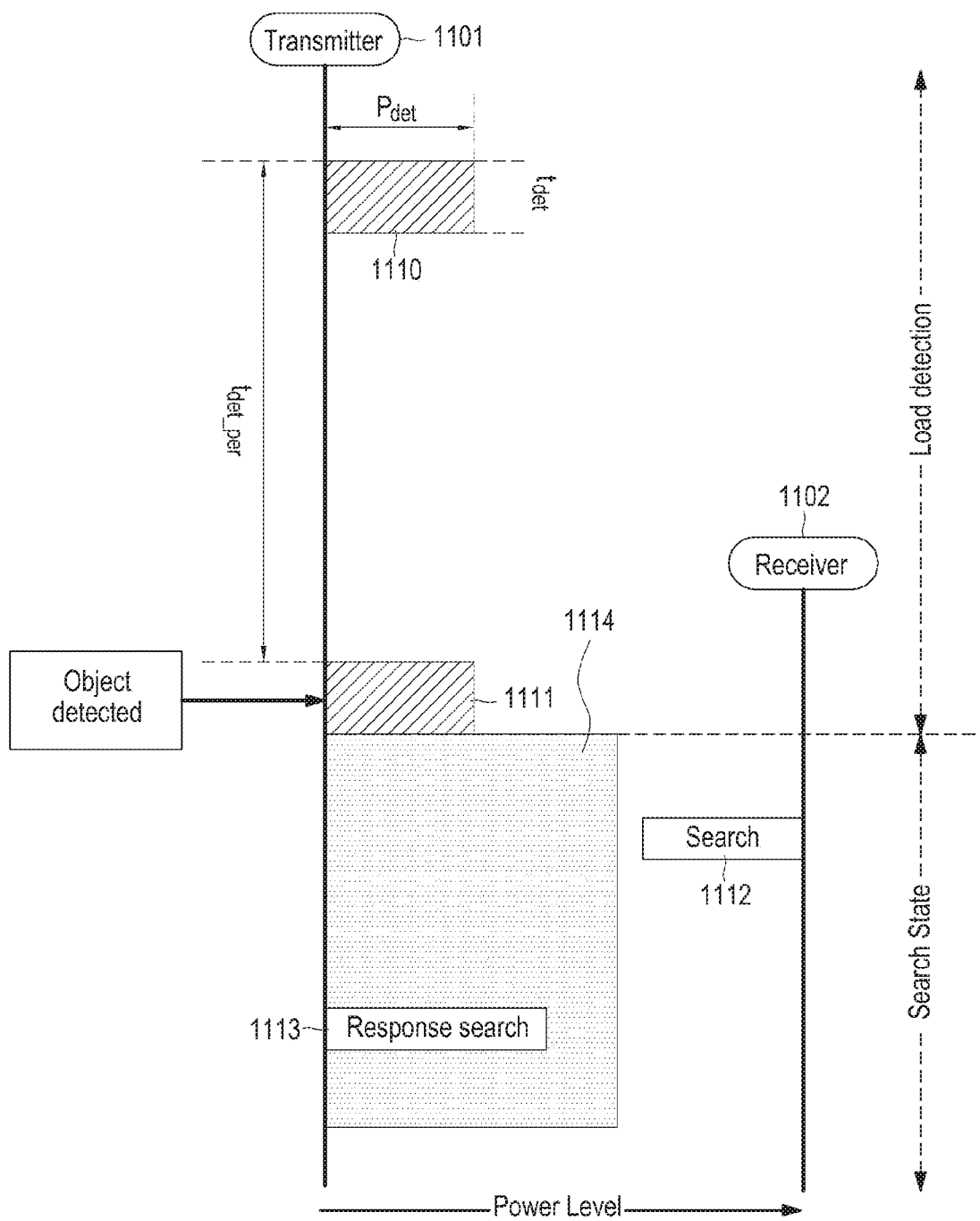
FIG. 4 illustrates a conventional method of detecting a wireless power receiver.

FIG. 4 illustrates a conventional method of detecting a wireless power receiver.

Referring to FIG. 4, a wireless power transmitter 1101 remains in a detecting state, wherein it transmits the detection power Pdet 1110 and 1111, during an effective duration tdet for each predetermined cycle tdetper. The detection power Pdet 1110 and 1111, and the effective duration tdet are determined based on a minimum power and time required for the wireless power transmitter 1101 to detect whether there is a candidate device for wireless charging within an effective range by detecting a load change of the power transmitter, i.e., a load change of a resonator. That is, because a candidate device, i.e., a metal object, is detected by a load change of the resonator, the wireless power transmitter 1101 may minimize power consumption in the detection state by periodically generating a sine wave having a relatively low voltage, but still capable of detecting the load of the resonator for a sufficient time to detect the load. The detection state is maintained until a new device is detected during the effective duration tdet.

For example, when a wireless power receiver is located over the wireless power transmitter 1101, the wireless power transmitter 1101 may detect the load change and determine that an object is nearby. Although FIG. 4 describes that the wireless power transmitter 1101 detects a nearby object based on a load change, the wireless power transmitter 1101 may detect a nearby object based on other criteria, such as a voltage change, a current change, a temperature change, a phase change, etc.

When the wireless power receiver 1102 is placed adjacent to the wireless power transmitter 1101, the wireless power transmitter 1101 detects the load change when transmitting the detection power Pdet 1111.

Upon detecting an object, i.e., the wireless power receiver 1102, in the effective detection duration tdet, the wireless power transmitter 1101 then transmits driving power Preg 1114. Here, the driving power 1114 has a sufficient power level to drive a controller or an MCU of the wireless power receiver 1102. The wireless power receiver 1102 transmits a search signal 1112, and the wireless power transmitter 1101 responds to the wireless power receiver 1120 with a response search signal 1113.

As described above, the conventional wireless power transmitter 1101 applies the detection power periodically to detect a wireless power receiver. However, when a wireless power receiver has relatively low power consumption, the wireless power transmitter 1101 may not detect the wireless power receiver, because the low power consumption may not cause a significant enough load change to be detected. In this case, the load change of the wireless power transmitter 1101 is not distinguishable from noise. Thus, the conventional wireless power transmitter 1101 will not detect the wireless power receiver.

Figure 5:
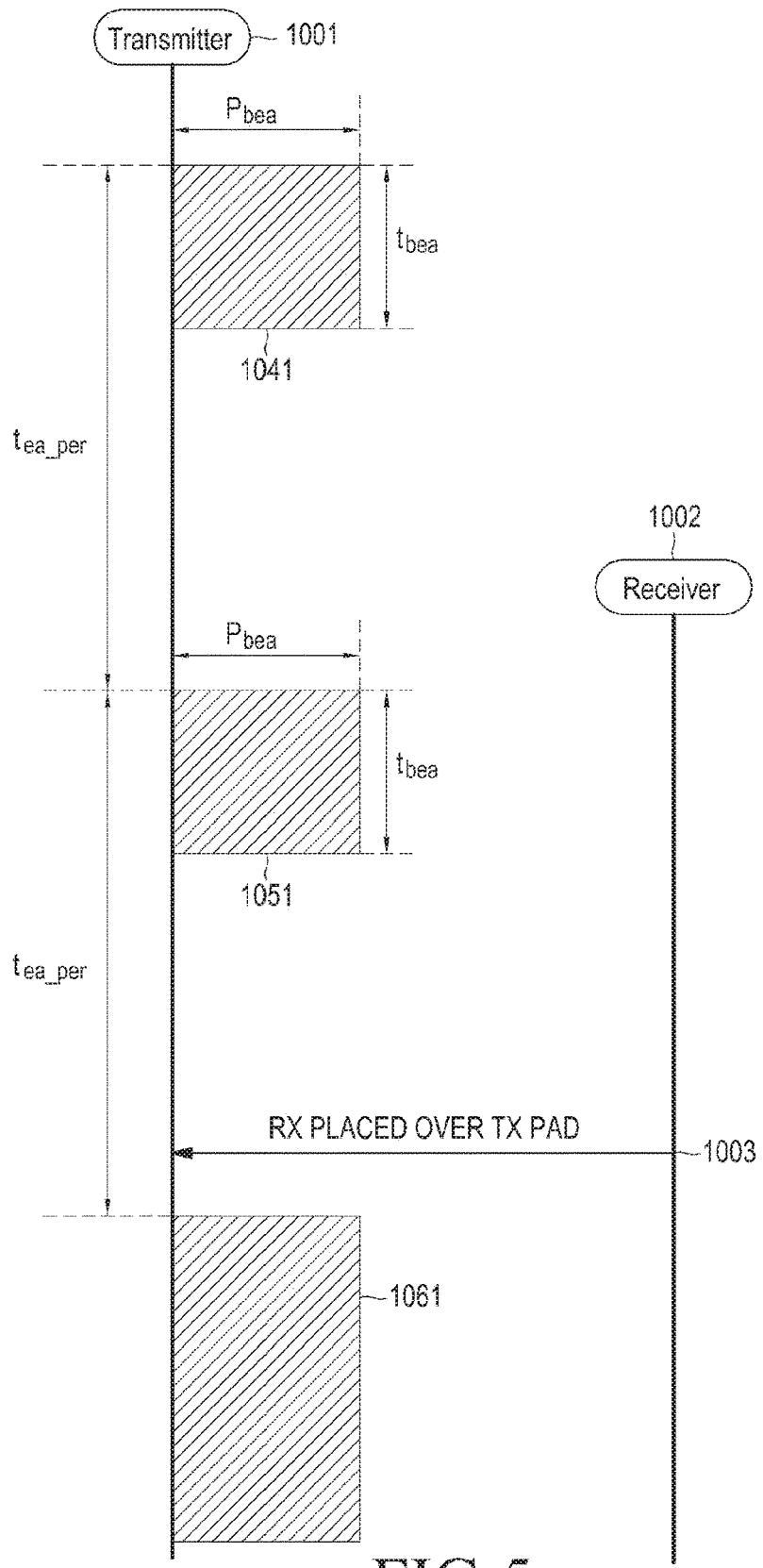
FIG. 5 illustrates a conventional method of detecting a wireless power receiver.

FIG. 5 illustrates a conventional method of detecting a wireless power receiver.

Referring to FIG. 5, the conventional wireless power transmitter 1001 remains in the detecting state, wherein the detection powers Pbea 1041 and 1051 are transmitted during an effective detection duration tbea for each predetermined cycle tea_per. The detection power Pbea 1041 and 1051 drives a wireless power receiver and the effective detection duration tbea is a time for which to drive the wireless power receiver and conduct certain communication.

For example, when a wireless power receiver 1002 is placed over a wireless power transmitter 1001, as at time 1003, the wireless power transmitter 1001 detects a load change and determines that an object is located nearby. Although FIG. 5 is described with the wireless power transmitter 1001 detecting a nearby object based on a load change, the wireless power transmitter 1001 may also detect the nearby object based on other criteria, such as a voltage change, a current change, a temperature change, a phase change, etc.

When the wireless power receiver 1002 is placed over the wireless power transmitter 1001, i.e., at time 1003, the wireless power transmitter 1001 detects the load change within the next time tbea for which to transmit the detection power Pbea 1061.

Further, after detecting an object, i.e., the wireless power receiver 1002, in the effective detection duration, the wireless power transmitter 1001 keeps applying the detection power 1061.

As described above, the conventional wireless power transmitter 1001 in FIG. 5 applies the detection power periodically to detect the wireless power receiver 1002. However, the conventional wireless power transmitter 1001 continues to transmit power to drive the wireless power receiver 1002, while the wireless power receiver 1002 is driven and able to conduct communication, thereby wasting power.

Figure 6:
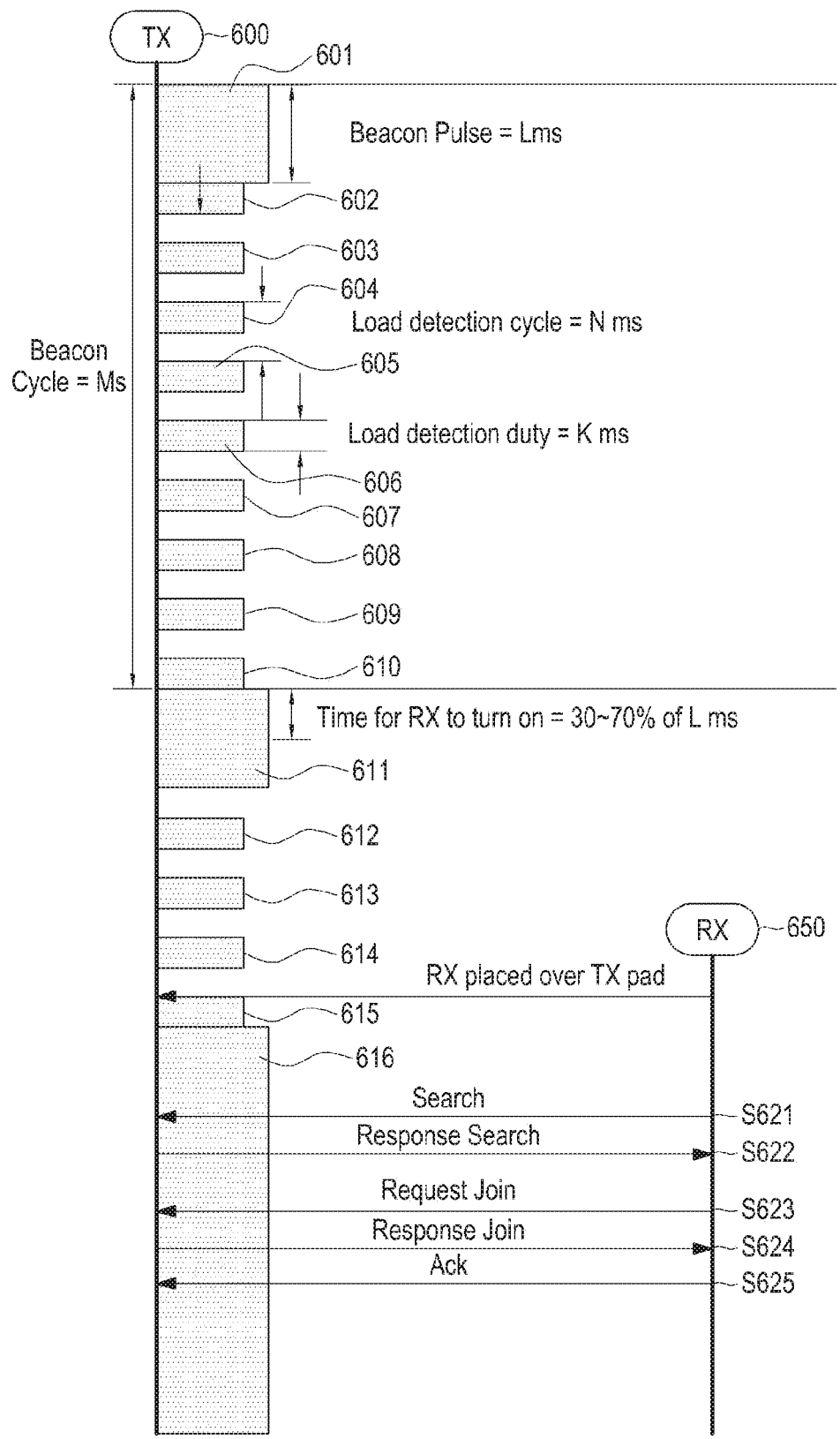
FIG. 6 illustrates a method of detecting a wireless power receiver, according to an embodiment of the present invention.

FIG. 6 illustrates a method of detecting a wireless power receiver, according to an embodiment of the present invention.

Referring to FIG. 6, a wireless power transmitter 600 applies different kinds of detection power during a predetermined cycle (referred to herein as a "beacon cycle"). The beacon cycle includes first and second periods of time. Specifically, the wireless power transmitter 600 applies a first detection power 601 for the first period of time and second detection powers 602 to 610 for the second period of time. The wireless power transmitter 600 applies the first detection power 601 for a time of L ms.

The first detection power 601 is strong enough to drive a wireless power receiver. For the time of the L ms for which the first detection power 601 transmitted, the wireless power receiver is driven and can communicate. Each of the second detection powers 602 to 610 have a sufficient power level to detect a wireless power receiver. Each of the second detection powers has a cycle of N ms. The gap between pieces of the second detection powers may be a time of (N–K) ms.

When the beacon cycle is over, the wireless power transmitter 600 applies the first detection power 611 again.

The wireless power transmitter 600 also uses the second detection powers 612 to 615.

Herein, it is assumed that a wireless power receiver 650 is placed over the wireless power transmitter 600 between applying the second detection powers 614 and 615. If the wireless power receiver 650 has relatively high power consumption, the wireless power transmitter 600 will detect a load change during the application of the second detection power 615, based on the load change.

After detecting the wireless power receiver 650, the wireless power transmitter 600 applies driving power 616, which drives the controller or an MCU of the wireless power receiver 650.

The wireless power receiver 650 receives the driving power 616. The wireless power receiver 650 generates and transmits a signal to search for a wireless power transmitter (hereinafter, referred to as a "search signal"), based on the received driving power 616.

The search signal is used to search for a wireless power transmitter from which to receive the wireless power, and may have a data structure as shown in Table 4, below.

TABLE 4

| Frame Type | Protocol Version | Sequence Number | Company ID | Product ID | Impedance | category | power consumption |
|---|---|---|---|---|---|---|---|
| Search | 4 bits | 1 bye | 1 byte | 4 bytes | 4 bits | 4 bits | 4 bits |

In Table 4, the Frame Type field indicates a type of the signal, i.e., a search signal. The Protocol Version field indicates a type of a protocol of the communication method, and is assigned 4 bits. The Sequence Number field indicates a sequential order of the signal, and is assigned 1 byte. For example, the sequential order of the Sequence Number may be incremented by 1 for each signal transmission or reception.

Specifically, if the Sequence Number of the notice signal of Table 1 is '1', then the search signal's Sequence Number may be '2'.

The Company ID field has information about a manufacturer of the wireless power receiver, and is assigned e.g., 1 byte. The Product ID field has product information of the wireless power receiver, e.g., serial number information. The Product ID is assigned 4 bytes.

The Impedance field has impedance information of the wireless power receiver, and is assigned 4 bits. In the Impedance field, impedance information of the receiving resonator may be written.

The Category field has rated-power information or size information of the wireless power receiver, and is assigned 4 bits. The Power Consumption field has power loss information estimated by the wireless power receiver, and is assigned 4 bits. Each or a sum of power loss (PRX-COIL) in the receiving resonator, power loss (PINDUCTION) due to the mutual inductance of the transmitting resonator and the receiving resonator, power loss (PREC) in a rectifier of the wireless power receiver may be written in the Power Consumption field. Additionally, voltage and current at the input end of a DC-to-DC converter of the wireless power receiver may also be written in the Power Consumption field.

The wireless power transmitter may manage related information of each wireless power receiver based on the input search signal. Table 5 is an example of a device control table, according to an embodiment of the present invention.

As shown in Table 5, the device control table may manage the Session ID, company ID, Product ID, Load Characteristic, Current Characteristic, Voltage characteristic, Efficiency Characteristic, Status Characteristic, input voltage at the input end of the DC-to-DC converter, output voltage and output current at the output end of the DC-to-DC converter of the wireless power receiver, etc. The status characteristic provides information about whether the wireless power receiver is completely charged and in standby mode, is insufficiently charged and in standby mode, is being charged in a Constant Voltage (CV) mode, or is being charged in Constant Current (CC) mode.

The wireless power transmitter transmits a signal to respond to the request for searching for a wireless power transmitter (hereinafter, referred to as a "response search signal") to the wireless power receiver in response to the search signal, in step S622. For example, the response search signal may have a data structure as shown in Table 6 below.

TABLE 6

| Frame Type | Reserved | Sequence Number | Network ID |
|---|---|---|---|
| Response Search | 4 bits | 1 byte | 1 byte |

In Table 6, the Frame Type field indicates a type of the signal, i.e., a response search signal. The Reserved field is reserved for later use, and assigned 4 bits. The Sequence Number field indicates a sequential order of the corresponding signal, and is assigned 1 byte. For example, the sequential order of the Sequence Number may be incremented by 1 for each signal transmission or reception.

The Network ID field indicates a network identifier of the wireless power transmitter, and is assigned 1 byte.

The wireless power receiver transmits a signal to the wireless power transmitter to request subscription to a wireless power transmitting/receiving network (hereinafter, referred to as a "request join" signal), in step S623. For example, the request join signal may have a data structure as shown in Table 7.

TABLE 5

| Session ID | company ID | Product ID | Load Characteristic | Current Characteristic | Voltage characteristic | efficiency characteristic | status characteristic | input voltage | output voltage | output current |
|---|---|---|---|---|---|---|---|---|---|---|
| 1 | 0x11111111 | 0x11111111 | 25 | 300 mA | 5 V | 75% | complete & standby | — | 5 V | 300 mA |
| 2 | 0x22222222 | 0x11111111 | 30 | 500 mA | 3 V | 70% | Charge(CV) | 3 V | 3 V | 400 mA |
| 3 | 0x33333333 | 0x22222222 | 10 | 100 mA | 5 V | 80% | charge(CC) | 5 V | 5 V | 100 mA |
| 4 | 0x44444444 | 0x11111111 | 50 | 500 mA | 5 V | 75% | Charge(CC) | 5 V | 5 V | 500 mA |
| 5 | 0x55555555 | 0x33333333 | 100 | 500 mA | 12 V | 75% | standby | — | 12 V | 500 mA |

TABLE 7

| Frame Type | Reserved | Sequence Number | Network ID | Product ID | Input Voltage MIN | Input Voltage MAX | Typical Output Voltage | Typical Output Current | impedance | power consumption |
|---|---|---|---|---|---|---|---|---|---|---|
| Request join | 4 bit | 1 Byte | 1 Byte | 4 Byte | 1 Byte | 1 Byte | 1 Byte | 1 Byte | 4 bit | 4 bit |

In Table 7, the Frame Type field indicates a type of the signal, i.e., a request join signal. The Reserved field is reserved for later use, and is assigned 4 bits. The Sequence Number field indicates a sequential order of the corresponding signal, and is assigned 1 byte. For example, the sequential order of the Sequence Number may be incremented by 1 for each signal transmission or reception.

The Network ID field indicates a network identifier of the wireless power transmitter, and is assigned 1 byte. The Product ID field has product information of the wireless power receiver, which includes serial number information. The Input Voltage MIN field indicates a minimum voltage applied at the input end of the DC-to-DC converter (not shown) of the wireless power receiver, and is assigned 1 byte.

The Input Voltage MAX field indicates a maximum voltage applied at the input end of the DC-to-DC converter (not shown) of the wireless power receiver, and is assigned 1 byte. The Typical Output Voltage field indicates a rated voltage applied at the output end of the DC-to-DC converter of the wireless power receiver, and is assigned 1 byte. The Typical Output Current field indicates a rated current passing through the output end of the DC-to-DC converter of the wireless power receiver, and is assigned 1 byte.

The Impedance field has impedance information of the wireless power receiver, and is assigned 4 bits. In the Impedance field, impedance information of the receiving resonator may be written. Further, each or a sum of power loss (PRX-COIL) in the receiving resonator, power loss (PINDUCTION) due to the mutual inductance of the transmitting resonator and the receiving resonator, power loss (PREC) in a rectifier of the wireless power receiver may be written in the Power Consumption field. Additionally, voltage and current at the input end of the DC-to-DC converter of the wireless power receiver may also be written in the Power Consumption field.

The wireless power transmitter may determine whether to subscribe the detected wireless power receiver to the wireless power network based on the received request join signal. For example, the wireless power transmitter may determine whether to subscribe the wireless power receiver to the wireless power network based on the device control table shown in Table 4. The wireless power transmitter may deny the subscription of the wireless power receiver, if power requested by the wireless power receiver is higher than power that can be supplied by the wireless power transmitter.

Having determined to subscribe the wireless power receiver to the wireless power network, the wireless power transmitter may assign the wireless power receiver a session ID. The wireless power transmitter may generate a signal to respond to the request join signal (hereinafter, referred to as a "response join signal") including the session ID or information about whether to subscribe the wireless power receiver to the wireless power network. In step S624, the wireless power transmitter transmits the response join signal to the wireless power receiver.

For example, the response join signal may have a data structure as shown in Table 8.

TABLE 8

| Frame Type | Reserved | Sequence Number | Network ID | Permission | Session ID |
|---|---|---|---|---|---|
| Response Join | 4 bits | 1 byte | 1 byte | 4 bits | 4 bits |

In Table 8, the Frame Type field indicates a type of the signal, i.e., a response join signal. The Reserved field is reserved for later use, and is assigned 4 bits. The Sequence Number field indicates a sequential order of the corresponding signal, and is assigned 1 byte. For example, the sequential order of the Sequence Number may be incremented by 1 for each signal transmission or reception.

The Network ID field indicates a network identifier of the wireless power transmitter, and is assigned 1 byte. The Permission field indicates whether the wireless power receiver is permitted to subscribe to the wireless power network, and is assigned 4 bits. For example, a value '1' in the Permission field indicates that subscription of the wireless power receiver is permitted, while a value '0' in the Permission field indicates that subscription of the wireless power receiver is not permitted. The Session ID field indicates an identifier of a session assigned by the wireless power transmitter to the wireless power receiver for the wireless power transmitter to control the wireless power network. The Session ID field is assigned 4 bits.

The wireless power receiver 650 transmits an ACK signal in response to the response signal, in step S625.

Figure 7:
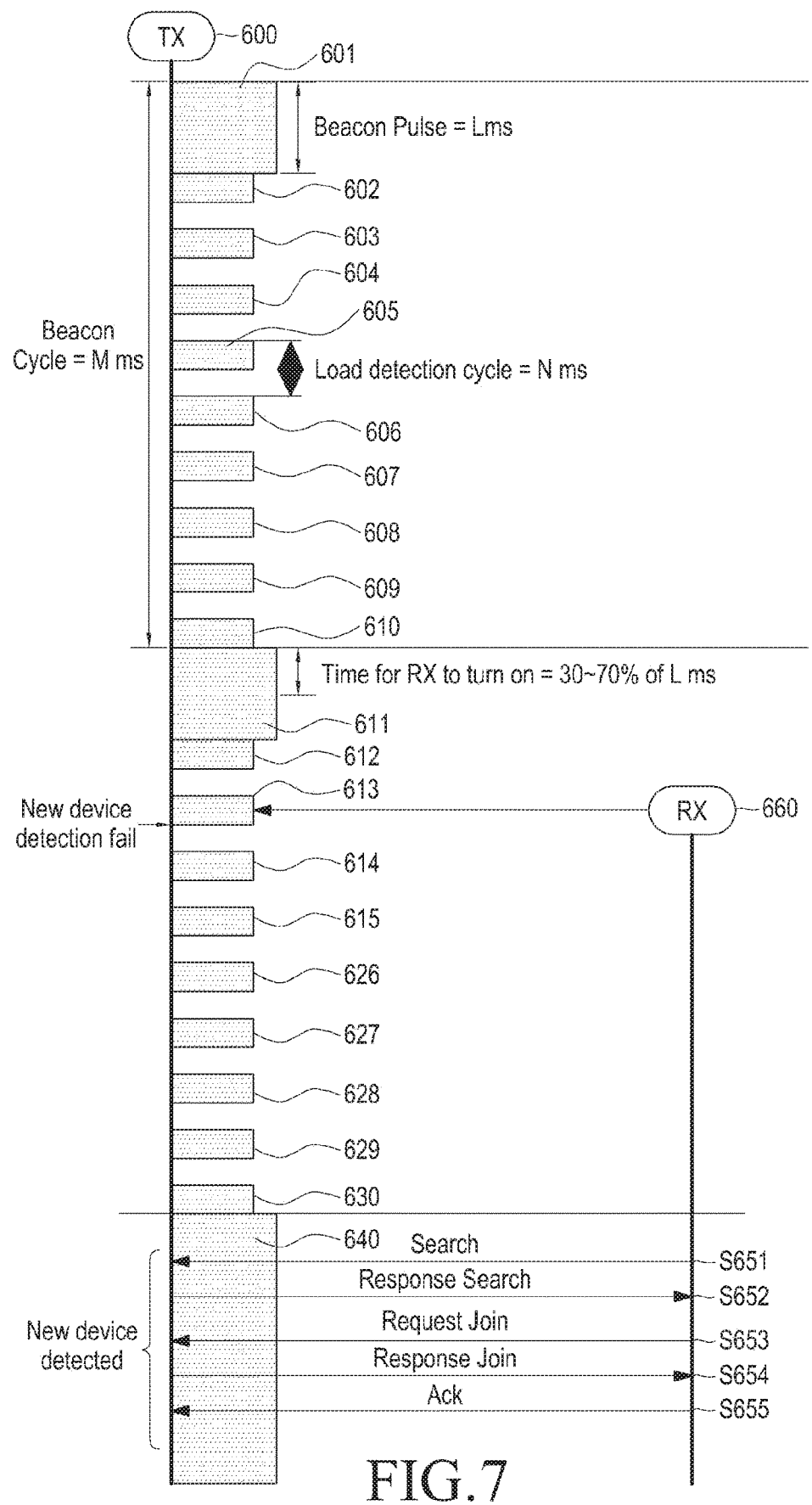
FIG. 7 illustrates a method of detecting a relatively small wireless power receiver, according to an embodiment of the present invention.

FIG. 7 illustrates a method of detecting a relatively small wireless power receiver, according to an embodiment of the present invention.

Referring to FIG. 7, a wireless power receiver 660 is placed over the wireless power transmitter 600 while the second detection power 613 is applied. However, it is assumed that the wireless power transmitter 600 does not detect a load change with the second detection power 613. Thus, the wireless power transmitter 600 does not immediately detect the wireless power receiver 660.

The wireless power transmitter 600 then applies a first detection power 640 for a new period of time. The wireless power transmitter 600 detects the load change with the first detection power 640 and detects the wireless power receiver 660 based on the load change. Thereafter, the wireless power transmitter 600 keeps applying the first detection power 640. The wireless power receiver 660 receives the first detection power 640 and transmits the search signal based on the first detection power 640, in step S651. In step S652, the wireless power transmitter 600 transmits the response search signal in response to the search signal. The wireless power receiver 660 transmits the request join signal in step S653, and the wireless power transmitter 600 transmits the response join signal in step S654. In step S655, the wireless power receiver 660 transmits the ACK signal.

Figure 8:
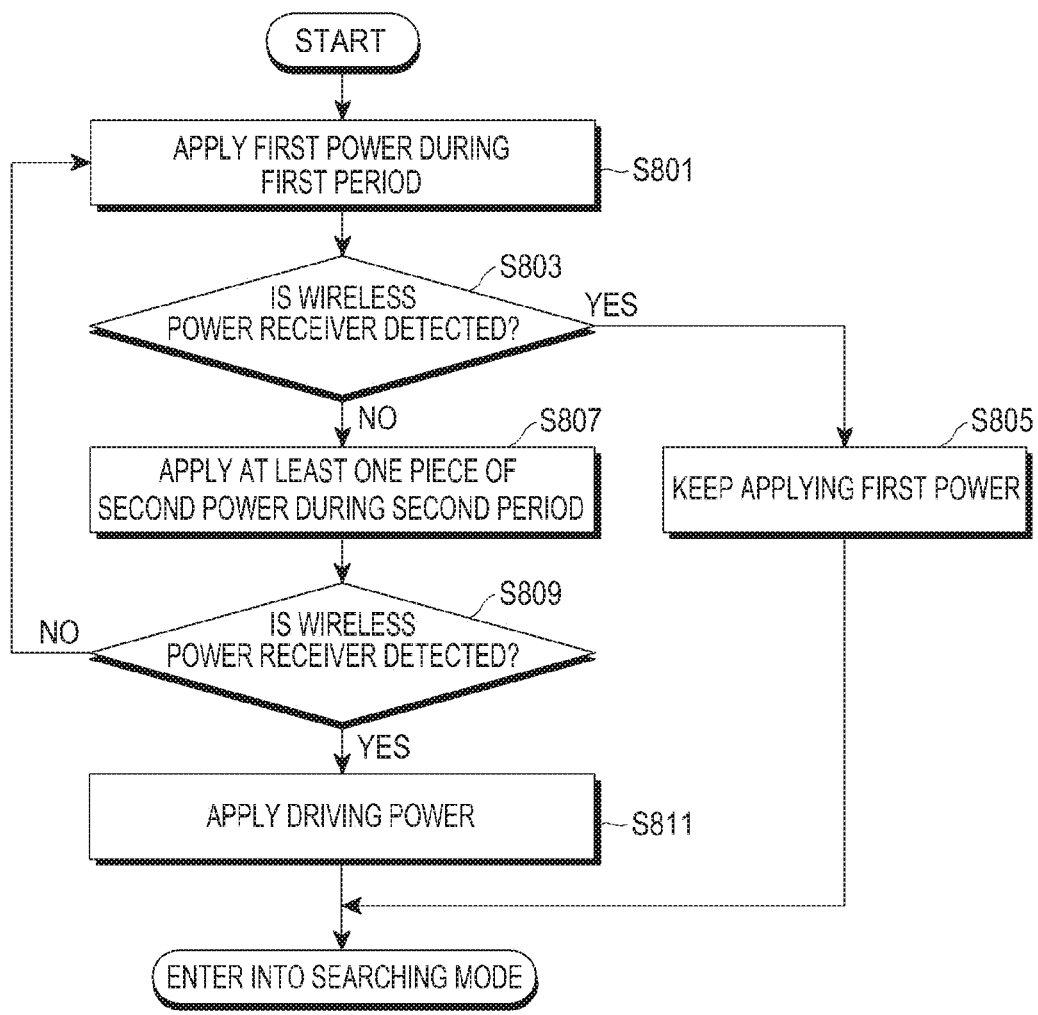
FIG. 8 is a flowchart illustrating a method of controlling a wireless power transmitter, according to an embodiment of the present invention.

FIG. 8 is a flowchart illustrating a method of controlling a wireless power transmitter, according to an embodiment of the present invention.

Referring to FIG. 8, the wireless power transmitter applies a first detection power for a first period of time, in step S801. The first detection power is strong enough to drive the wireless power receiver and enable the wireless communication unit to communicate. The first detection power may be applied for a time during which the wireless power receiver is driven and communicating.

In step S803, the wireless power transmitter determines whether the wireless power receiver is detected, while the first detection power is applied. If the wireless power transmitter detects the wireless power receiver in step S803, the wireless power transmitter keeps applying the first detection power in step S805.

However, if the wireless power transmitter fails to detect the wireless power receiver in step S803, the wireless power transmitter may apply a second detection power during a second period of time in step S807. Each of the second detection powers are lower than the first detection power, but still have sufficient power to detect a wireless power receiver. Alternatively, the second detection power may be applied for a time required to increase voltage to reach the second detection power and then to drop the voltage. As illustrated in FIGS. 6 and 7, the second detection powers may be applied with a predetermined gap between each other.

In step S809, the wireless power transmitter determines if a wireless power receiver is detected, based on the second detection power. If the wireless power transmitter fails to detect the wireless power receiver in step S809, the wireless power transmitter applies the first detection power again during a new period of time, in step S801. However, when the wireless power receiver is detected in step S809, the wireless power transmitter applies driving power in step S811. The driving power is high enough to drive the wireless power receiver and enable the wireless power receiver to communicate. The driving power has a higher level than the second detection powers.

Figure 9:
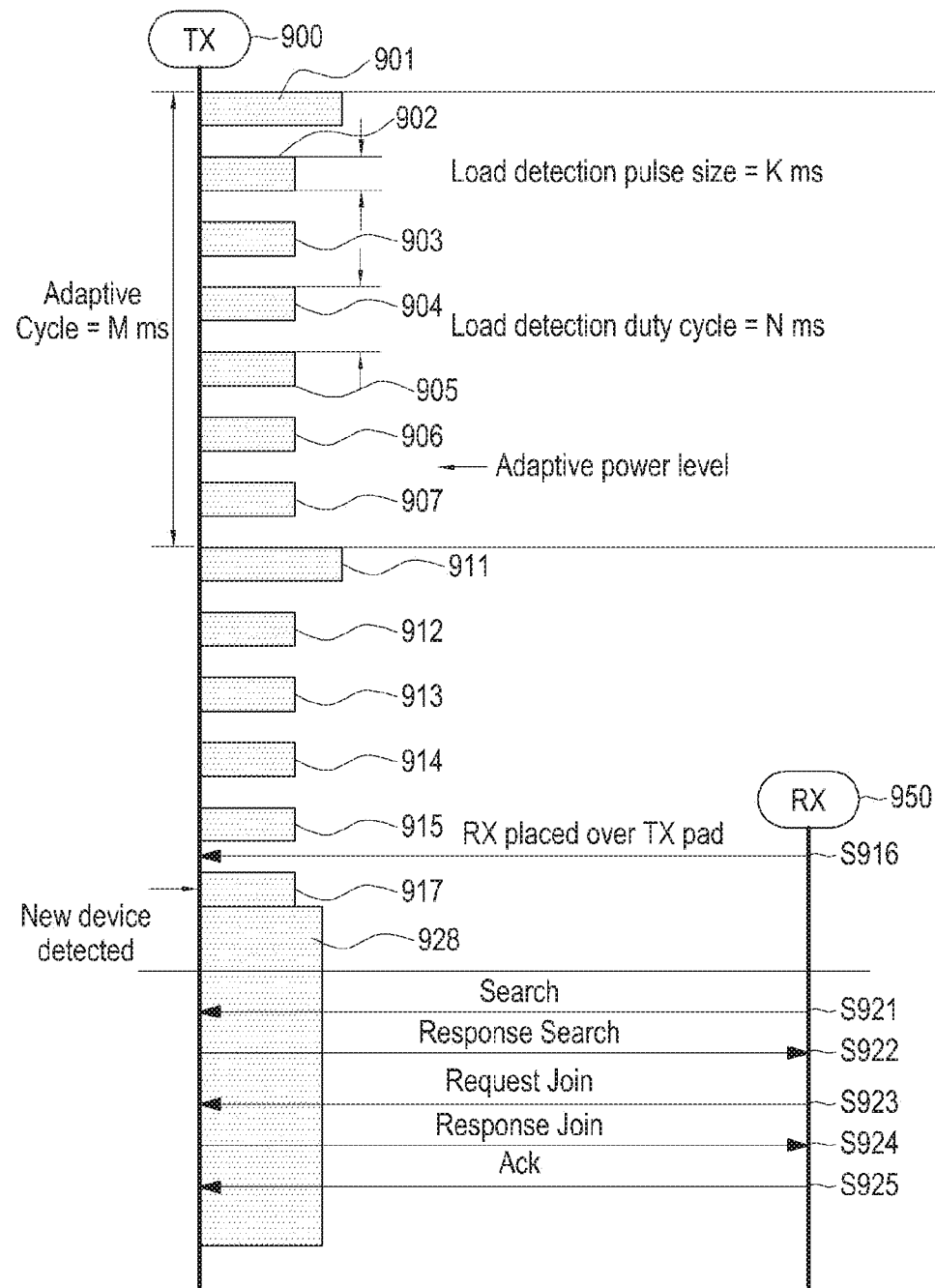
FIG. 9 illustrates a method of detecting a wireless power receiver, according to an embodiment of the present invention.

FIG. 9 illustrates a method of detecting a wireless power receiver, according to an embodiment of the present invention.

Referring to FIG. 9, a wireless power transmitter 900 applies different detection powers during a predetermined cycle (referred to herein as an "adaptive cycle"). Specifically, the wireless power transmitter 900 applies first detection power 901 for a time of K ms and then applies second detection powers 902 to 907.

The first detection power 901 is strong enough to detect a load change with respect to a wireless power receiver that has a relatively low consumption power, and may be applied for a minimum period of time to detect the wireless power receiver. Alternatively, the first detection power 901 may be applied for a time required to increase voltage to reach the first detection power and then to drop the voltage back.

After applying the first detection power 901, the wireless power transmitter 900 applies the second detection powers 902 to 907. The wireless power transmitter 900 applies the second detection powers 902 to 907 within a period of N ms. Each of the second detection powers 902 to 907 has a duration of K ms. That is, each of the second detection powers 902 to 907 may have the same application time as that of the first detection power 901. Further, each of the second detection powers 902 to 907 may be a minimum power to detect a wireless power receiver that has relatively high consumption power.

When the adaptive cycle M ms is over, the wireless power transmitter 900 applies first detection power 911 again. After applying the first detection power 911, the wireless power transmitter 900 applies the second detection powers 912 to 917.

In FIG. 9, a wireless power receiver 950 is placed over the wireless power transmitter 900, after application of the second detection power 915 is completed, in step S916. The wireless power receiver 950 may have a relatively high consumption power.

While applying the second detection power 917, the wireless power transmitter 900 detects a load change with respect to the wireless power receiver 950, and in turn, detects the wireless power receiver 950 based on the load change. Having detected the wireless power receiver 950, the wireless power transmitter 900 applies driving power 928.

While applying the driving power 928, the wireless power receiver 950 transmits the search signal, in step S921. In step S922, the wireless power transmitter 900 transmits the response search signal in response to the search signal. The wireless power receiver 950 transmits the request join signal in step S923, and the wireless power transmitter 900 transmits the response join signal in step S924. In step S925, the wireless power receiver 950 transmits the ACK signal.

Figure 10:
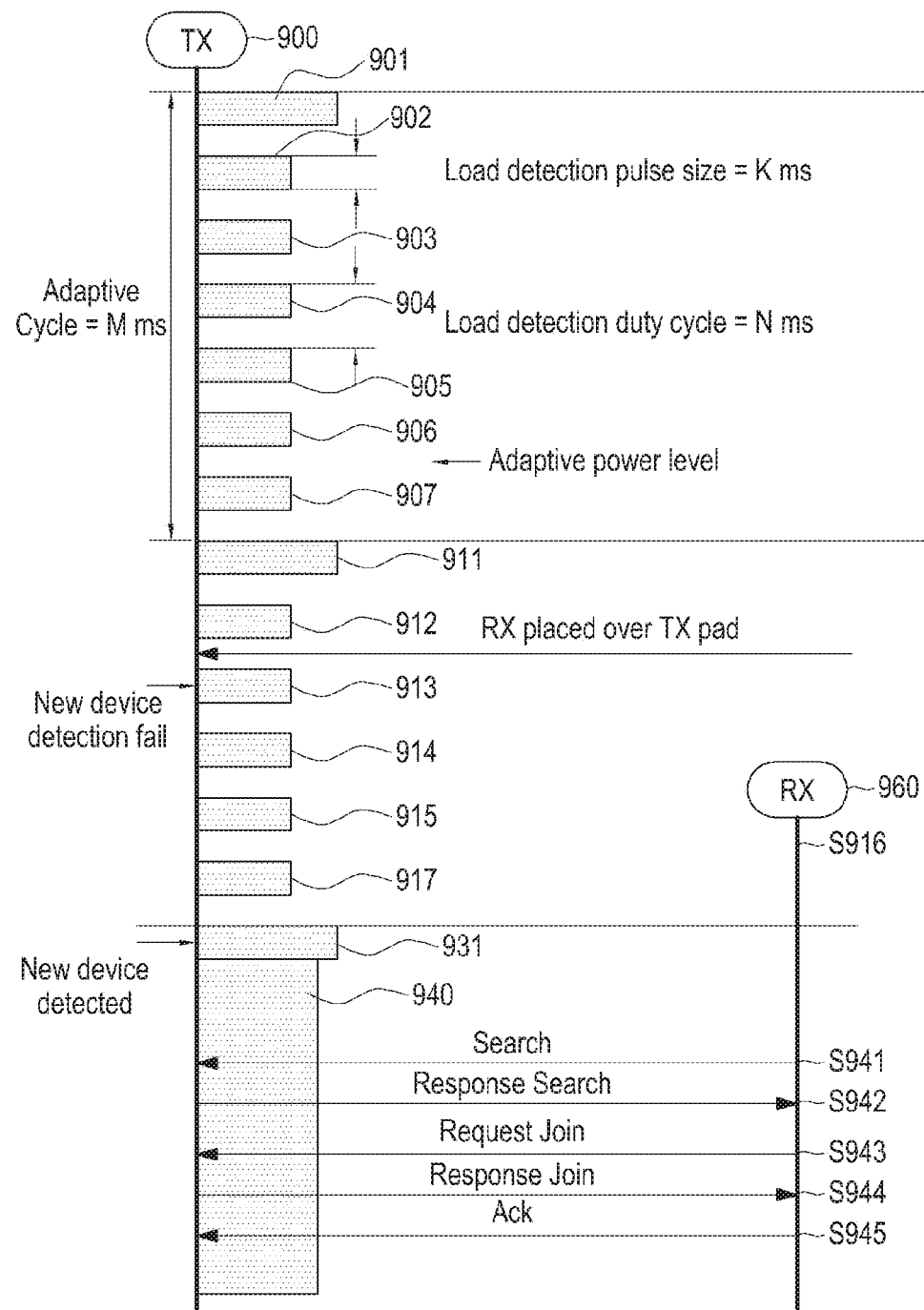
FIG. 10 illustrates method of detecting a relatively small wireless power receiver, according to an embodiment of the present invention.

FIG. 10 illustrates method of detecting a relatively small wireless power receiver, according to an embodiment of the present invention. In FIG. 10, a wireless power receiver 960 is placed over the wireless power transmitter 900 between application of the second detection power 912 and the second detection power 913.

However, the wireless power transmitter 900 may not detect a load change with the second detection power 913. Thus, the wireless power transmitter 900 may not detect the wireless power receiver 960 and will apply the first detection power 931 for a new period of time.

The wireless power transmitter 900 detects the load change with the first detection power 931 and detects the wireless power receiver 960 based on the load change. Having determined that the wireless power receiver 960 is nearby, the wireless power transmitter 900 applies driving power 940, which is received by the wireless power receiver 960.

In step S941, the wireless power receiver 960 transmits the search signal based on the driving power 940. In step S942, the wireless power transmitter 900 transmits the response search signal in response to the search signal. The wireless power receiver 960 transmits the request join signal in step S943, and the wireless power transmitter 900 transmits the response join signal in step S944. In step S945, the wireless power receiver 960 transmits the ACK signal.

Figure 11:
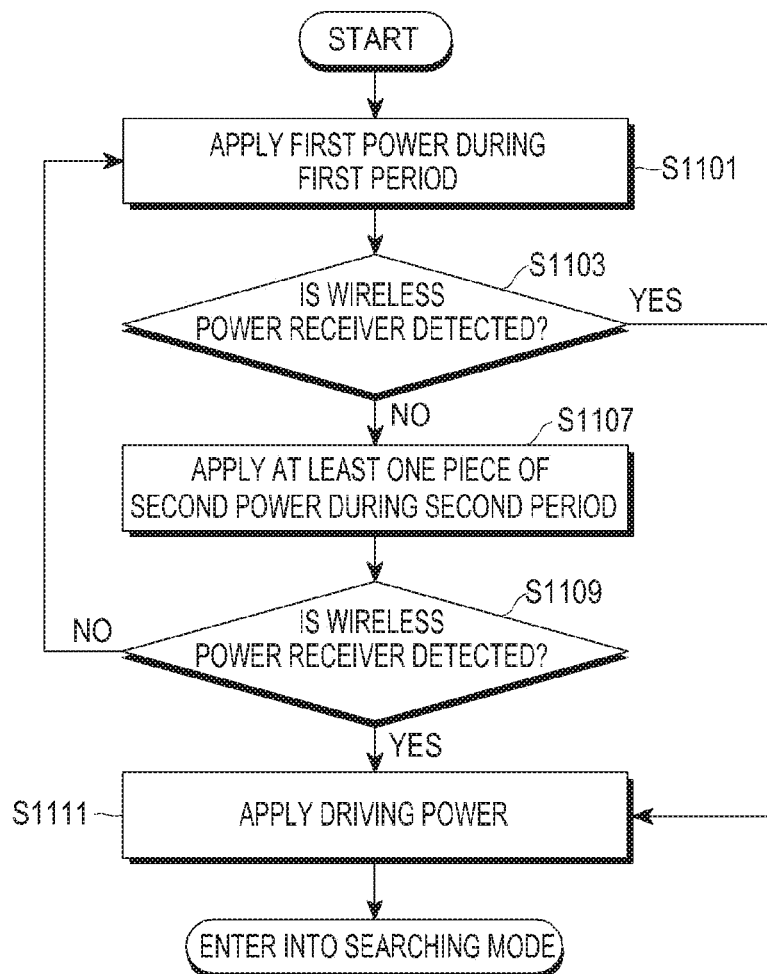
FIG. 11 is a flowchart illustrating a method of controlling a wireless power transmitter, according to an embodiment of the present invention.

FIG. 11 is a flowchart illustrating a method of controlling a wireless power transmitter, according to an embodiment of the present invention.

Referring to FIG. 11, the wireless power transmitter applies a first detection power for a first period of time, in step S1101. The first detection power is sufficient for detecting a wireless power receiver whose consumption power is relatively low and may be applied for a minimum period of time to detect a wireless power receiver. Alternatively, the first detection power may be applied for a time required to increase voltage to reach the first detection power and then to drop the voltage back.

The wireless power transmitter determines whether a wireless power receiver is detected while the first detection power is applied, in step S1103. If the wireless power transmitter detects the wireless power receiver in step S1103, the wireless power stops applying the first detection power and applies driving power in step S1111.

However, if the wireless power transmitter fails to detect the wireless power receiver in step S1103, the wireless power transmitter may apply the second detection power during a second period of time, in step S1107. Each of the second detection powers may have minimum power to detect the wireless power receiver that has relatively high For example, a wireless power receiver in the third category has a higher power consumption, higher reception power, or greater size than a wireless power receiver in the first category. Thus, the third detection power may have higher power consumption power, higher reception power, or a greater size than the first detection power because the lower the power consumption of the wireless power receiver is, the higher the power level required for detection is.

Table 9 illustrates such categories.

TABLE 9

| | Result of Survey | | | Rx Classification (Tentative) | |
|---|---|---|---|---|---|
| | Typical | Expected Rx | | | |
| Device | Charge Power | Resonator Size | Z-gap | Category | Output Power |
| BT Ear Set | 0.42 W | 10 × 10 mm² | 5 mm | #1 | Po ≤ 1 W |
| Eye Glasses for 3D TV | 0.42 W | 30 × 50 mm² | 15 mm | | |
| Smart Remote Controller | 1.995 W | 40 × 70 mm² | 3 mm | #2 | |
| Digital Still Camera | 1.995 W | 8 × 50 mm² | 5 mm | | 1 W < Po ≤ 3 W |
| Nintendo DS | 2 W | 40 × 70 mm² | 3 mm | | |
| Smart Phone | 4 W | 40 × 70 mm² | 3 mm | #3 | 3 W < Po ≤ 6 W |
| iPhone4 | 4 W | 40 × 70 mm² | 4 mm | | |
| Galaxy Tab 7 | 7 W | 60 × 120 mm² | 4 mm | #4 | |
| New Galaxy Tabs | 8-10 W | 120 × 120 mm² | 4 mm | | 6 W < Po ≤ 12 W |
| iPad2 | 10.5 W | 120 × 120 mm² | 4 mm | | 12 W < Po ≤ TBD | consumption power. The second detection powers may be applied for a minimum period of time to detect a wireless power receiver.

Alternatively, the second detection power may be applied for a time required to increase voltage to reach the second detection power and then to drop the voltage back. The second detection power may be applied with a predetermined gap between each other.

The wireless power transmitter may detect the wireless power receiver based on the second detection power, in step S1109. If the wireless power transmitter fails to detect the wireless power receiver in step S1109, the wireless power transmitter applies the first detection power again during a new period of time, in step S1101. However, having detected the wireless power receiver in step S1109, the wireless power transmitter applies driving power in step S1111. The driving power drives the wireless power receiver and enables the wireless power receiver to communicate. The driving power is higher than the second detection powers.

Figure 12:
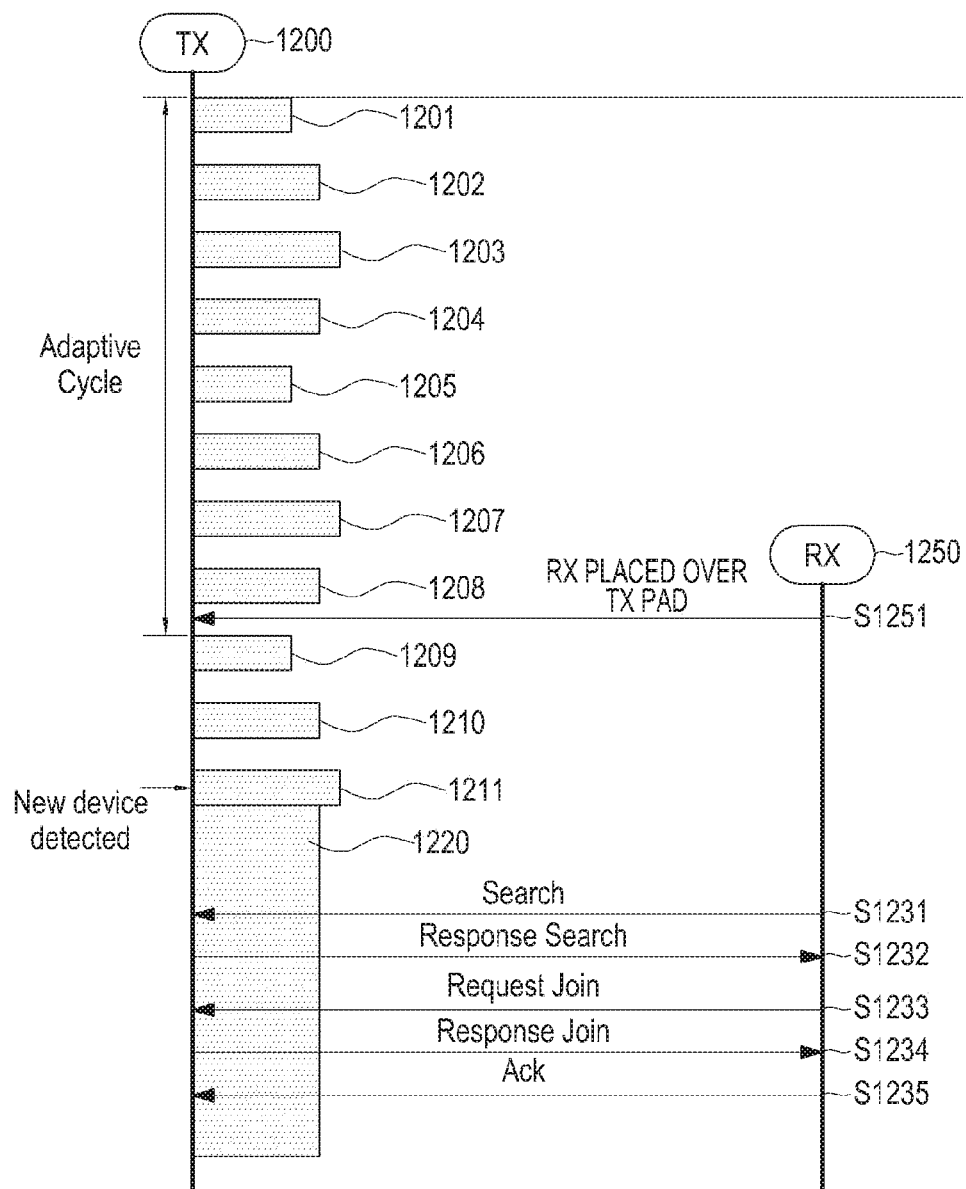
FIG. 12 illustrates a method of detecting a wireless power receiver, according to an embodiment of the present invention.

FIG. 12 illustrates a method of detecting a wireless power receiver, according to an embodiment of the present invention.

Referring to FIG. 12, a wireless power transmitter 1200 applies different detection powers during a predetermined cycle (referred to herein as an "adaptive cycle"). For example, the wireless power transmitter 1200 applies different detection powers with three different power levels, i.e., a first detection power, a second detection power, and a third detection power. The first detection power has a minimum power that can detect a wireless power receiver in a third category. The second detection power has a minimum power level that can detect a wireless power receiver in a second category. The third detection power may have a minimum power level that can detect a wireless power receiver in a first category. The first to third categories are criteria for distinguishing different consumption powers, reception powers, or sizes of the wireless power receivers.

The wireless power transmitter 1200 applies different detection powers, e.g., the first to third detection powers, to detect a differently categorized wireless power receiver within a predetermined period of time.

In FIG. 12, a wireless power receiver 1250 is placed over the wireless power transmitter 1250 between the application of the second detection powers 1208 and 1209. The wireless power receiver 1250 belongs to the first category.

While applying the second detection power 1209, the wireless power transmitter 1200 may not detect the wireless power receiver 1250. Also, while applying the second detection power 1210, the wireless power transmitter 1200 may not detect the wireless power receiver 1250. The wireless power transmitter 1200 may detect a load change with the third detection power 1211. The wireless power transmitter 1200 detects the wireless power receiver 1250 in the first category based on the load change, and then stops applying the third power 1211 and applies driving power 1220.

In step S1231, the wireless power receiver 1250 transmits the search signal, based on the driving power 1220. The wireless power transmitter 1200 transmits the response search signal in response to the search signal in step S1232. The wireless power receiver 1250 transmits the request join signal in step S1233, and the wireless power transmitter 1200 transmits the response join signal in step S1234. In step S1235, the wireless power receiver 1250 transmits the ACK signal.

However, if the wireless power receiver belongs to the second category, the wireless power transmitter 1200 detects the wireless power receiver in the second category during the application of the second detection power or the application of the third detection power.

Alternatively, if the wireless power receiver belongs to the third category, the wireless power transmitter 1200 detects the wireless power receiver in the second category during the application of the first detection power, the application of the second detection power, or the application of the third detection power.

Figure 13A:
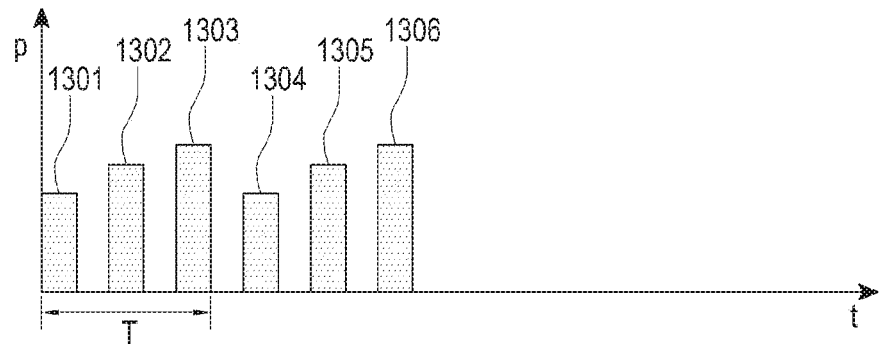
FIGS. 13A to 13C are diagrams illustrating detected power applied by a wireless power transmitter, according to various embodiments of the present invention.
Figure 13B:
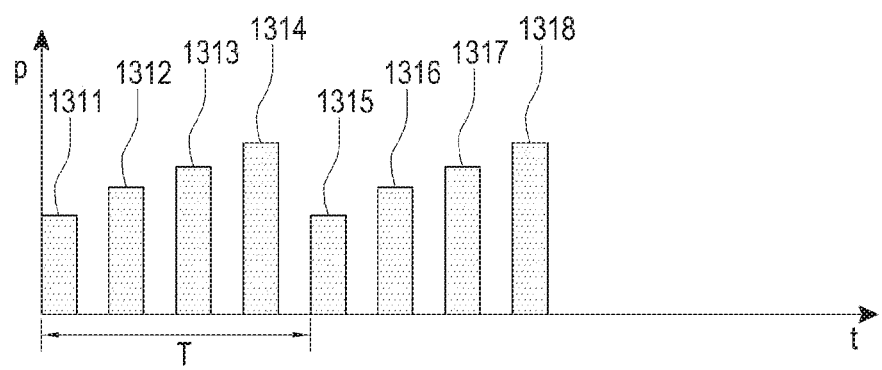
Figure 13C:
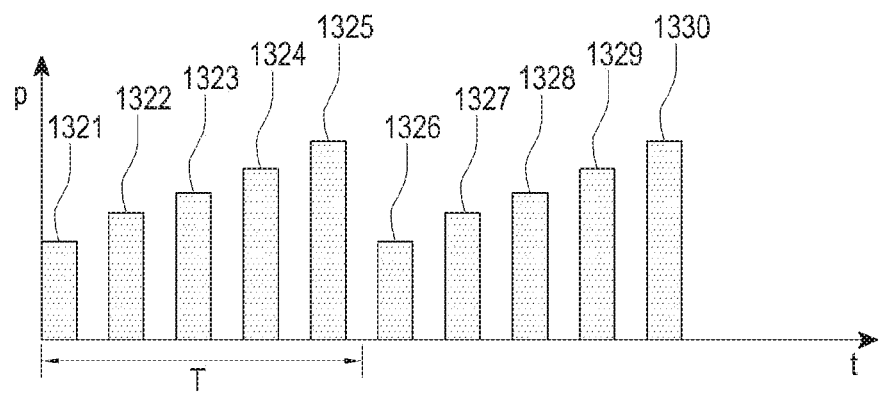

FIGS. 13A to 13C are diagrams illustrating detected power applied by a wireless power transmitter, according to various embodiments of the present invention. Specifically, the wireless power transmitter is in a first class in FIG. 13A, in a second class in FIG. 13B, and in a third class in FIG. 13C.

Referring to FIG. 13A, the wireless power transmitter applies the first to third detection powers within a predetermined period T. The different detection powers with the three different power levels are classified into a first detection power, a second detection power, and a third detection power. The first detection power has a minimum power level that will detect a wireless power receiver in the third category, and the second detection power has a minimum power level that will detect a wireless power receiver in the second category, and the third detection power has a minimum power level that will detect a wireless power receiver in a first category.

In FIG. 13A, the wireless power transmitter sequentially applies the first to third detection powers 1301, 1302, and 1303 in an increasing direction of power level within the predetermined period T. Alternatively, more or fewer detection powers may be applied. The first to third detection power may also be applied differently, e.g., randomly, than illustrated in FIG. 13A. The first to third detection power 1304, 1305, and 1306 may also be applied repeatedly.

Referring to FIG. 13B, the wireless power transmitter applies the first to fourth detection powers within the predetermined period T. As described above, the wireless power transmitter is a second-class wireless power transmitter, and charges a wireless power receiver belonging to any of first to fourth categories. The different detection power with four different power levels may be classified into a first detection power, a second detection power, a third detection power, and a fourth detection power. The first detection power has a minimum power level that will detect a wireless power receiver in a fourth category, the second detection power has a minimum power level that will detect a wireless power receiver in a third category, the third detection power has a minimum power level that will detect a wireless power receiver in a second category, and the fourth detection power has a minimum power level that will detect a wireless power receiver in a first category.

In FIG. 13B, the wireless power transmitter sequentially applies the first to fourth detection powers 1311, 1312, 1313, and 1314 in an increasing direction of power level within the predetermined period T. Alternatively, more or fewer detection powers may be applied. The first to fourth detection power may also be applied differently, e.g., randomly, than illustrated in FIG. 13B. The first to fourth detection power 1315, 1316, 1317, and 1318 may also be applied repeatedly.

Referring to FIG. 13C, the wireless power transmitter applies the first to fifth detection powers within the predetermined period T. As described above, the wireless power transmitter is a third-class wireless power transmitter, and charges a wireless power receiver belonging to any of first to fifth categories. The different detection powers with five different power levels are classified into a first detection power, a second detection power, a third detection power, a fourth detection power, and a fifth detection power. The first detection power has a minimum power level that will detect a wireless power receiver in the fifth category, the second detection power has a minimum power level that will detect a wireless power receiver in the fourth category, the third detection power has a minimum power level that will detect a wireless power receiver in the third category, the fourth detection power has a minimum power level that will detect a wireless power receiver in the second category, and the fifth detection power has a minimum power level that will detect a wireless power receiver in the first category.

In FIG. 13C, the wireless power transmitter sequentially applies the first to fifth detection powers 1321, 1322, 1323, 1324, and 1325 in an increasing direction of power level within the predetermined period T. Alternatively, more or fewer detection powers may be applied. The first to fifth detection powers may also be applied differently, e.g., randomly, than illustrated in FIG. 13C. The first to fifth detection power 1326, 1327, 1328, 1329, and 1330 may also be applied repeatedly.

According to various embodiments of the present invention, a configuration and process of detecting a wireless power receiver is provided by the wireless power transmitter. Furthermore, according to the embodiments of the present invention, the wireless power receiver may be detected in a more efficient and reliable manner, thereby preventing power waste.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for wirelessly transmitting power to a wireless power receiver by a wireless power transmitter, the method comprising:
    periodically outputting a power sequence comprising a first detection power and a second detection power through a resonator of the wireless power transmitter, wherein a level of the first detection power is greater that a level of the second detection power;
    detecting a change of a load impedance while outputting the power sequence;
    based on detecting the change of the load impedance, stopping outputting of the power sequence, wherein the change of the load impedance is caused by placement of the wireless power receiver near the wireless power transmitter; and
    after stopping outputting of the power sequence, outputting a driving power for driving a controller of the wireless power receiver.

2. The method of claim 1, wherein detecting the change of the load impedance comprises:
    identifying the change of the load impedance exceeding a predetermined threshold; and
    detecting the wireless power receiver based on the change of the load impedance exceeding the predetermined threshold.

3. The method of claim 1, wherein the power sequence further comprises a third detection power which is sufficient to drive the controller of the wireless power receiver.

4. The method of claim 3, wherein the first detection power and the second detection power is outputted for a first duration and the third detection power is outputted for a second duration, and wherein the second duration is long enough to drive the controller of the wireless power receiver.

5. The method of claim 4, wherein the second duration is longer than the first duration.

6. The method of claim 1, wherein the level of the second detection power is a minimum power level that will detect the change of the load impedance with respect to the wireless power receiver in a first category.

7. The method of claim 1, wherein the second detection power is outputted after a predetermined time gap after outputting the first detection power.

8. The method of claim 3, wherein outputting the driving power comprises continually outputting the third detection power when the wireless power receiver is detected while the third detection power is outputted.

9. The method of claim 1, wherein outputting the driving power comprises increasing one of the first detection power and the second detection power to a power sufficient to drive the controller of the wireless power receiver.

10. A wireless power transmitter for transmitting power to a wireless power receiver, the wireless power transmitter comprising:
   a resonator for transmitting power to the wireless power receiver, and
   a controller configured to:
   periodically output a power sequence comprising a first detection power and a second detection power through the resonator, wherein a level of the first detection power is greater that a level of the second detection power;
   detect a change of a load impedance while outputting the power sequence;
   based on detecting the change of the load impedance, stop outputting of the power sequence, wherein the change of the load impedance is caused by placement of the wireless power receiver near the wireless power transmitter; and
   after stopping outputting of the power sequence, output a driving power for driving a controller of the wireless power receiver.

11. The wireless power transmitter of claim 10, wherein the controller identifies the change of the load impedance exceeding a predetermined threshold, and detect the wireless power receiver based on the change of the load impedance exceeding the predetermined threshold.

12. The wireless power transmitter of claim 10, wherein the power sequence further comprises a third detection power which is sufficient to drive the controller of the wireless power receiver.

13. The wireless power transmitter of claim 12, wherein the first detection power and the second detection power is outputted for a first duration and the third detection power is outputted for a second duration, and wherein the second duration is long enough to drive the controller of the wireless power receiver.

14. The wireless power transmitter of claim 13, wherein the second duration is longer than the first duration.

15. The wireless power transmitter of claim 10, wherein the level of the second detection power is a minimum power level that will detect the change of the load impedance with respect to the wireless power receiver in a first category.

16. The wireless power transmitter of claim 10, wherein the second detection power is outputted after a predetermined time gap after outputting the first detection power.

17. The wireless power transmitter of claim 12, wherein the controller continually outputs the third detection power when the wireless power receiver is detected while the third detection power is outputted.

18. The wireless power transmitter of claim 10, wherein the controller increases one of the first detection power and the second detection power to a power sufficient to drive the controller of the wireless power receiver.

* * * * *